United States Patent [19]

Moore et al.

[11] 4,119,941

[45] Oct. 10, 1978

[54] ACOUSTIC COUPLER

[75] Inventors: Donald K. Moore, Honolulu, Hi.; George R. Beaman, Leucadia, Calif.; John D. Hightower, Kailua; Craig W. Graham, Jr., Honolulu, both of Hi.

[73] Assignee: The United States of America as represented by the Secretary of the Navy, Washington, D.C.

[21] Appl. No.: 822,463

[22] Filed: Aug. 8, 1977

[51] Int. Cl.$^2$ ............................................. H04B 11/00
[52] U.S. Cl. ..................................... 340/5 R; 340/3 E
[58] Field of Search .............. 340/3 E, 4 R, 5 R, 5 C, 340/8 S

[56] References Cited

U.S. PATENT DOCUMENTS

| | | | |
|---|---|---|---|
| 3,145,365 | 8/1964 | Jacobs | 340/8 S |
| 3,277,428 | 10/1966 | Sampsell | 340/3 E X |
| 3,517,378 | 6/1970 | Barrett | 340/5 R |
| 4,069,469 | 1/1978 | Masaharu | 340/5 R |

OTHER PUBLICATIONS

Mitson et al., *Deep Sea Research,* vol. 14, pp. 259–270, Apr. 1967.

*Primary Examiner*—Richard A. Farley
*Attorney, Agent, or Firm*—Richard S. Sciascia; Ervin F. Johnston

[57] ABSTRACT

An acoustic coupler is provided for extending the listening and signal gathering capabilities of an existing cable connected hydrophone system. The acoustic coupler includes a sensor, such as an additional hydrophone, an acoustic projector, and a cable which electrically connects the acoustic projector to the additional hydrophone. A modulator is interconnected in the cable between the projector and the additional hydrophone for modulating signals received by the additional hydrophone on a carrier wave which is within the bandpass of the existing hydrophone. With this arrangement the acoustic projector can be placed in water within listening distance of the existing hydrophone so that signals from the additional hydrophone can be transmitted over the existing hydrophone and its cable system.

10 Claims, 5 Drawing Figures

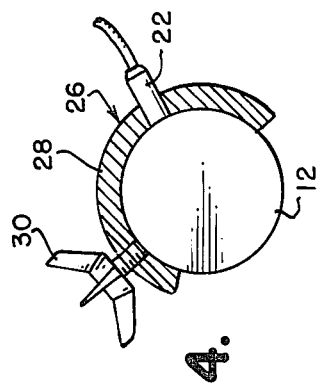
FIG. 4.
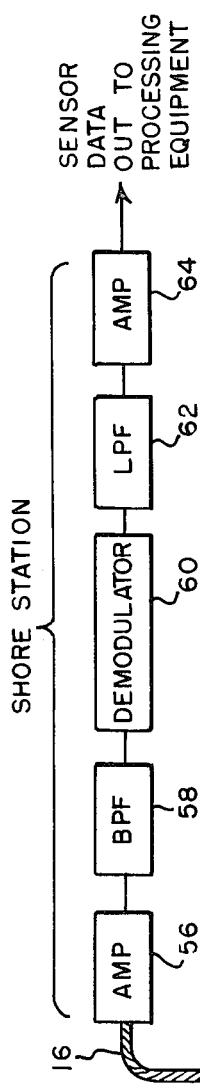
FIG. 5.
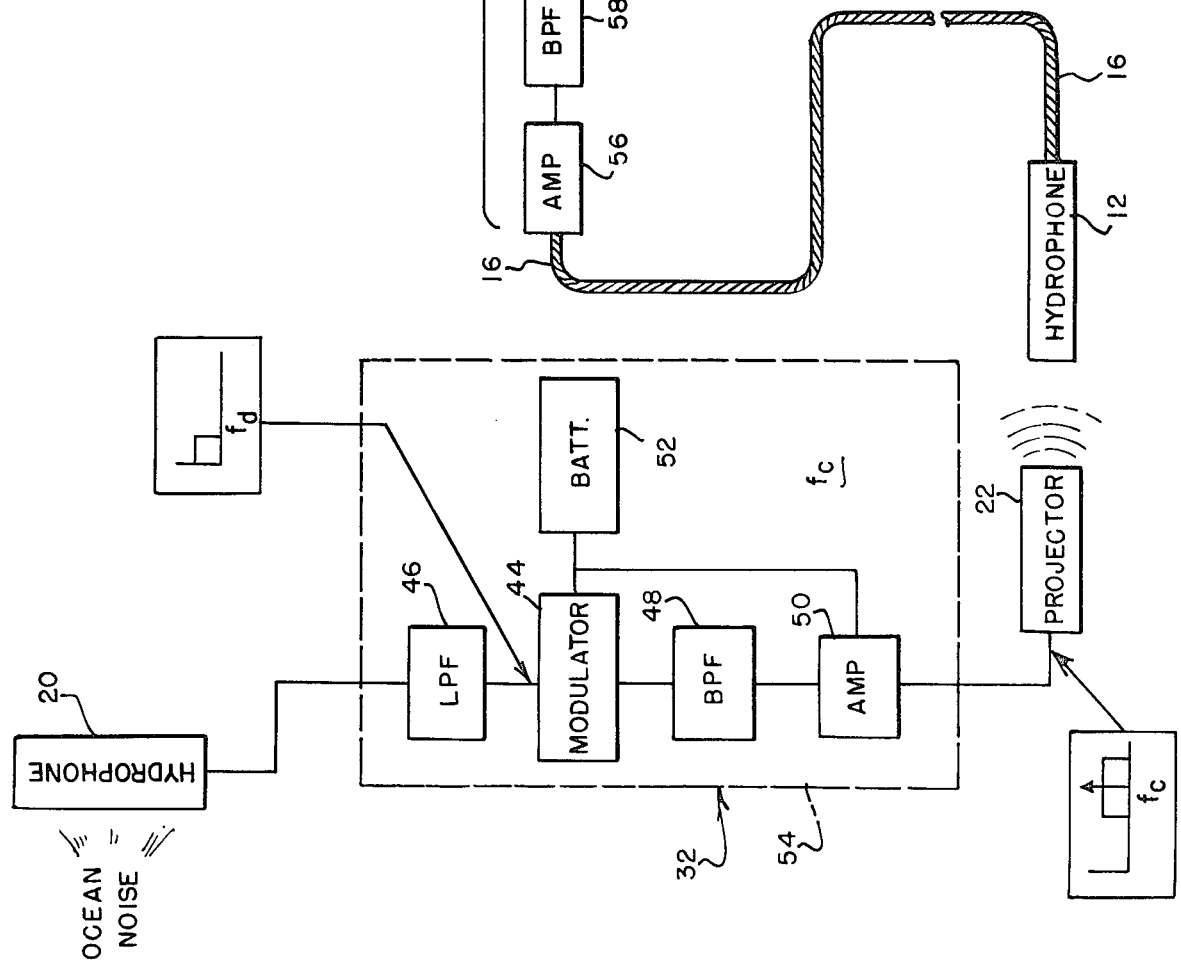

4,119,941

ACOUSTIC COUPLER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to an acoustic coupler which will extend the listening and signal gathering capabilities of an existing cable connected hydrophone system.

For years hydrophones have been utilized in ocean waters to provide a surveillance capability for the U.S. Navy. One of the most reliable hydrophones systems is where passive hydrophones are cable connected to a shore station. The cable connected system eliminates the need for a transmitter and is secure from enemy interception. However, cable connected hydrophone systems are very costly and very much fixed in their original locations. The retrofitting of such systems has been avoided because of the substantial cost involved, even though the addition of improved hydrophones or other sensors would greatly increase the systems capabilities.

SUMMARY OF THE INVENTION

The present invention provides an inexpensive acoustic coupler for extending the listening capability of an existing cable connected hydrophone system. This has been accomplished by providing a sensor, such as an additional hydrophone, an acoustic projector, and a cable which electrically connects the acoustic projector to the additional hydrophone. A modulator is interconnected in the cable between the projector and the additional hydrophone for modulating signals received by the additional hydrophone on a carrier wave which is within the bandpass of the existing hydrophone. With this arrangement the acoustic projector can be placed in water within listening distance of the existing hydrophone so that signals from the additional hydrophone can be transmitted over the existing cable connected hydrophone system.

OBJECTS OF THE INVENTION

An object of the present invention is to provide a device for extending the surveillance capability of an existing cable connected hydrophone system.

A further object is to provide a device for inexpensively extending the listening or signal gathering capabilities of an existing cable connected hydrophone system.

Another object is to provide an inexpensive arrangement for adding additional sensors to an existing cable connected hydrophone system.

Still another object is to provide a method for inexpensively extending the capabilities of an existing cable connected hydrophone system.

These and other objects of the invention will become more readily apparent from the ensuing specification when taken together with the drawings.

DESCRIPTION OF THE DRAWINGS

FIG. 4 is a cross-sectional side view of a clamp for connecting the acoustic coupler to an existing hydrophone.

FIG. 5 is a schematic illustration showing the various electronic components of the acoustic coupler.

DESCRIPTION OF THE PREFERRED EMBODIMENTS

Figure 1:
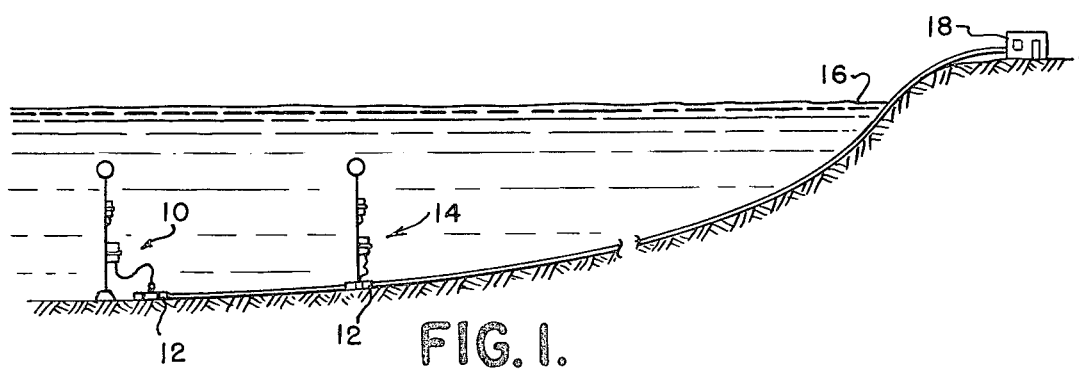
FIG. 1 is an ocean elevation view of several embodiments of the present invention coupled to a pair of hydrophones which are cable connected to a shore station.

Referring now to the drawings wherein like reference numerals designate like or similar parts throughout the several views there is illustrated in FIG. 1 one embodiment 10 of the acoustic coupler which is connected to an existing hydrophone 12, and another embodiment 14 of the acoustic coupler which is connected to an existing hydrophone 12, both existing hydrophones 12 being connected by a cable 16 to a shore station 18. Both embodiments 10 and 14 of the present invention are capable of significantly increasing the surveillance capability of the existing cable connected hydrophone system.

Figure 2:
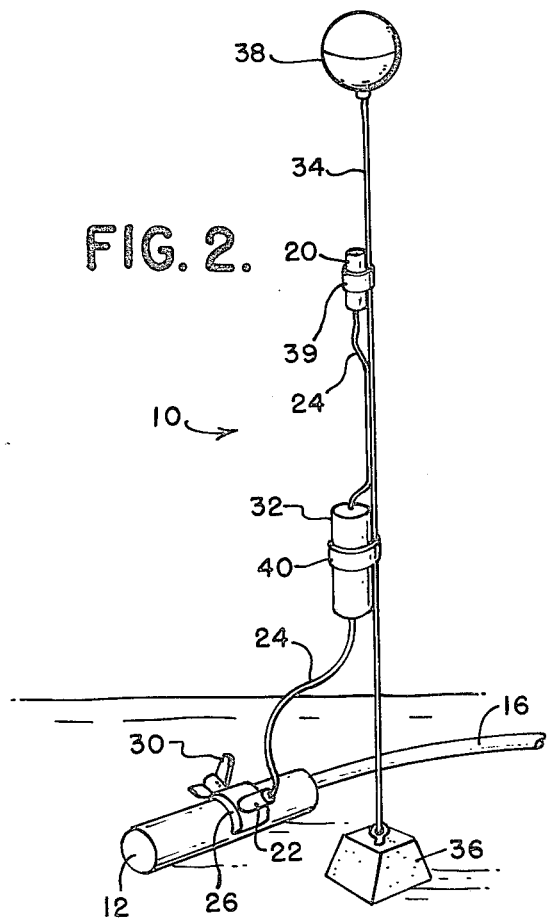
FIG. 2 is an isometric illustration of one embodiment of the present invention connected to an existing cable connected hydrophone system.

As illustrated in FIG. 2, the embodiment 10 of the present invention includes an additional hydrophone 20, an acoustic projector 22, and a cable 24 which electrically connects the acoustic projector 22 to the additional hydrophone 20. Sensors other than the hydrophone 20 could be utilized, such as a current meter or an electric field sensor. A clamp 26 is provided for clamping the acoustic projector 22 directly on the existing hydrophone 12. As illustrated in FIG. 4, the clamp 26 may include a semiarcuate member 28 which partially encompasses the existing hydrophone 12 and has a large wingnut 30 for holding the clamp in place. The projector 22 extends through the semiarcuate member 28 of the clamp so as to be in communicating engagement with the exterior surface of the existing hydrophone 12. With this arrangement the clamp 26 can be slid onto the existing hydrophone 12 and the wingnut 30 tightened so that the existing hydrophone 12 will receive signals from the acoustic projector 22.

Referring again to FIG. 2, the embodiment 10 of the acoustic coupler further includes a modulator means 32, which will be described in detail hereinafter, which are interconnected in the cable 24 between the projector 22 and the additional hydrophone 20 for modulating signals received by the additional hydrophone 20 on a carrier wave which is within the bandpass of the existing hydrophone 12. With this arrangement signals from the additional hydrophone 20 can be efficiently transmitted over the existing hydrophone 12 and its cable 16 to the shore station 18 where these signals can be processed. Up to this point the embodiment 10 of the acoustic coupler is identical to the embodiment 14 of the acoustic coupler. The acoustic coupler 10 differs in its particular deployment in the water adjacent to the existing hydrophone 12. The acoustic coupler embodiment 10 includes a strength line 34, such as a wire, an anchor 36 which is connected at one end of the strength line, and a float 38 which is connected at the other end of the strength line so that the strength line will be suspended vertically upward in the water. The additional hydrophone 20 may be mounted on the strength line 34 between the anchor 36 and the float 38 by a clamp 39. The modulator means 32 may be mounted on the strength line 34 between the anchor 36 and the additional hydrophone 20 by a clamp 40. With this arrangement the existing hydrophone 20 and the modulator means 32 are anchored to the side of the existing hydrophone 12 with no strain on the cable 24 going to the projector 22.

Figure 3:
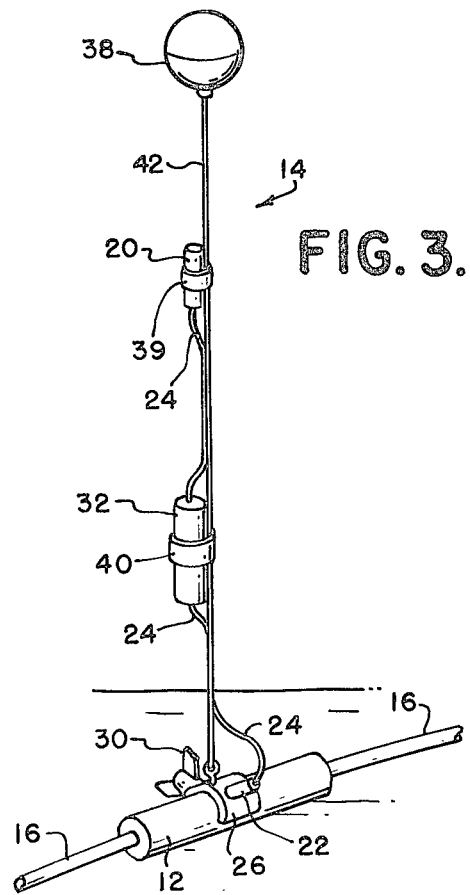
FIG. 3 is an isometric illustration of another embodiment of the invention connected to an existing cable connected hydrophone system.

As illustrated in FIG. 3, the embodiment 14 of the acoustic coupler differs from the embodiment 10 in that a strength line 42 directly connects the float 38 to the clamp 26, thereby eliminating the need for a separate anchor. This embodiment has an advantage of simplicity and less likelihood of entanglement of lines upon installation.

The electronics of the acoustic coupler system for either of the embodiments 10 or 14 is illustrated in FIG. 5. The modulating means 32 includes a modulator 44 which may have a center frequency $f_c$. A low pass filter 46, which is capable of passing signal frequencies up to $f_d$, may be connected to the input of the modulator 44 between the modulator 44 and the additional hydrophone 20. It is the essence of this invention that the modulator 44 generate a carrier wave with the center frequency $f_c$ which is within the bandpass capability of the existing hydrophone 12 and modulate this carrier wave with any signal frequencies between zero and $f_d$ which are passed by the low pass filter 46. The modulated carrier wave may be fed to a bandpass filter 48 and a power amplifier 50 before being transmitted through the projector 22 to the existing hydrophone 12. A power source, such as a battery 52, may supply the necessary power to the modulator 44 and the power amplifier 50. The low pass filter 46, the modulator 44, the bandpass filter 48, the power amplifier 50, and the battery 52 may be encased in a pressure casing 54 for protecting these components from the ambient seawater. At the shore station the cable 16 may be connected to an amplifier 56, thence to a bandpass filter 58, thence to a demodulator 60, thence to a low pass filter 62, and thence to an amplifier 64. The demodulator 60 will remove the carrier wave so that the desired signal goes to a low pass filter where ambient noise signals are removed. The purified signal is then amplified and fed to processing equipment, such as a chart recorder (not shown).

A method of the present invention communicates signals from a sensor, such as the additional hydrophone 20, to the existing hydrophone 12 and includes the steps of receiving acoustic signals on the existing hydrophone 20, generating a carrier wave within the modulator 44 which is within the bandpass of the existing hydrophone 12, modulating the carrier wave in the modulator 44 with the acoustic signals, and acoustically coupling the additional hydrophone 20 to the existing hydrophone 12 so that the modulated carrier wave is transmitted into the existing hydrophone 12. The acoustic coupling may be accomplished by feeding the modulated carrier wave to the projector 22 and directly connecting the projector 22 to the existing hydrophone 12 by the clamp 26. At the shore station 18 the modulated carrier wave from the existing hydrophone 12 may then be demodulated by the demodulator 60 to obtain the originally received acoustic signals.

Obviously, many modifications and variations of the present invention are possible in the light of the above teachings, and, it is therefore understood that within the scope of the disclosed inventive concept, the invention may be practiced otherwise than specifically described.

What is claimed is:

1. An acoustic coupler for extending the listening capability of an existing cable connected hydrophone system comprising:
   a sensor which is capable of sensing a condition and producing corresponding signals;
   an acoustic projector;
   a cable electrically connecting the acoustic projector to the sensor;
   means interconnected in the cable between the projector and the sensor for modulating signals received by the sensor on a carrier wave which is within the bandpass of the existing hydrophone; and
   means for clamping the acoustic projector directly on the existing hydrophone;
   whereby upon clamping the acoustic projector to the existing hydrophone, signals from the sensor can be transmitted over said existing cable connected hydrophone system.

2. An acoustic coupler as claimed in claim 1 including:
   said sensor being an additional hydrophone.

3. An acoustic coupler as claimed in claim 2 wherein the modulating means includes:
   a modulator;
   a low pass filter connected between the modulator and the additional hydrophone;
   a power amplifier connected between the modulator and the acoustic projector;
   power source means for supplying power to the modulator and the power amplifier; and
   a pressure casing encasing the low pass filter, modulator, power amplifier, and power source means.

4. An acoustic coupler for extending the listening capability of an existing cable connected hydrophone system comprising:
   an additional hydrophone which is capable of sensing a condition and producing corresponding signals;
   an acoustic projector;
   a cable electrically connecting the acoustic projector to the additional hydrophone;
   means interconnected in the cable between the projector and the additional hydrophone for modulating signals received by the additional hydrophone on a carrier wave which is within the bandpass of the existing hydrophone;
   means for clamping the acoustic projector directly on the existing hydrophone;
   a strength line;
   an anchor connected at one end of the strength line;
   a float connected at the other end of the strength line so as to be capable of suspending the strength line vertically upward in a body of water; and
   said additional hydrophone being mounted on the strength line between the anchor and the float.

5. An acoustic coupler as claimed in claim 4 wherein the modulating means includes:
   a modulator;
   a low pass filter connected between the modulator and the additional hydrophone;
   a power amplifier connected between the modulator and the acoustic projector;
   power source means for supplying power to the modulator and the power amplifier;

a pressure casing encasing the low pass filter, modulator, power amplifier, and power source means; and said pressure casing being mounted on the strength line between the anchor and the additional hydrophone.

6. An acoustic coupler for extending the listening capability of an existing cable connected hydrophone system comprising:

an additional hydrophone which is capable of sensing a condition and producing corresponding signals;

an acoustic projector;

a cable electrically connecting the acoustic projector to the additional hydrophone;

means interconnected in the cable between the projector and the additional hydrophone for modulating signals received by the additional hydrophone on a carrier wave which is within the bandpass of the existing hydrophone;

means for clamping the acoustic projector directly on the existing hydrophone;

a strength line;

one end of the strength line being connected to the clamping means;

a float connected at the other end of the strength line so as to be capable of suspending the strength line vertically upward in a body of water; and said additional hydrophone being mounted on the strength line between the clamping means and the float.

7. An acoustic coupler as claimed in claim 6 wherein the modulating means includes:

a modulator;

a low pass filter connected between the modulator and the additional hydrophone;

a power amplifier connected between the modulator and the acoustic projector;

power source means for supplying power to the modulator and the power amplifier;

a pressure casing encasing the low pass filter, modulator, power amplifier, and power source means; and said pressure casing being mounted on the strength line between the clamping means and the hydrophone.

8. A method of communicating signals from a sensor to an existing hydrophone comprising the steps of:

receiving signals from the sensor;

generating a carrier wave which is within the bandpass of the existing hydrophone;

modulating the carrier wave with said signals;

feeding the modulated carrier wave to a projector;

directly connecting the projector to the existing hydrophone so that the modulated carrier wave is transmitted to the existing hydrophone;

whereby the signal gathering capability of the existing hydrophone is extended.

9. A method as claimed in claim 8 including the step of:

demodulating the modulated carrier wave from the existing hydrophone to obtain the originally received signals.

10. A method as claimed in claim 9 including the step of:

providing an additional hydrophone as said sensor.

* * * * *